United States Patent [19]

Kronau

[11] Patent Number: 4,942,351
[45] Date of Patent: Jul. 17, 1990

[54] SYSTEM FOR MONITORING A LEVEL OF MATERIAL, DEVICE THEREFOR AND METHODS OF MAKING THE SAME

[75] Inventor: Paul D. Kronau, Knoxville, Tenn.
[73] Assignee: Robertshaw Controls Company, Richmond, Va.
[21] Appl. No.: 329,437
[22] Filed: Mar. 28, 1989
[51] Int. Cl.⁵ .............................................. G01F 23/44
[52] U.S. Cl. ...................... 318/642; 318/482; 73/313; 73/321
[58] Field of Search ............ 318/482, 642; 73/290 R, 73/301, 304 R, 304 C, 305, 306, 307, 308, 309, 313, 319, 321, 322; 340/612, 618, 620, 623, 624

[56] References Cited

U.S. PATENT DOCUMENTS

| | | | |
|---|---|---|---|
| 2,869,113 | 1/1959 | Reymonenq et al. | 73/313 X |
| 3,140,609 | 7/1964 | Mayes | 73/321 X |
| 3,237,593 | 3/1966 | Trotter | 318/482 X |
| 3,708,159 | 1/1973 | De Bray | 73/290 R X |
| 3,729,667 | 4/1973 | Taylor | 318/482 |
| 3,751,185 | 8/1973 | Gottliebson et al. | 73/321 X |
| 4,065,968 | 1/1978 | Sunagawa | 73/313 |
| 4,402,048 | 8/1983 | Tsuchida et al. | 340/612 X |
| 4,691,113 | 9/1987 | Corvazier et al. | 73/293 X |
| 4,708,191 | 11/1987 | Block et al. | 73/290 R X |
| 4,768,377 | 9/1988 | Habelmann et al. | 73/313 |
| 4,786,846 | 11/1988 | Uchida | 318/482 |

Primary Examiner—Bentsu Ro
Attorney, Agent, or Firm—Candor, Candor & Tassone

[57] ABSTRACT

A system for monitoring a level of material held in a confining means, a device therefor and methods of making the same are provided, the system comprising a rotatable reel, an electrically operated motor operatively interconnected to the reel for causing rotation of the reel in either direction of rotation thereof, a flexible support wound on the reel and having a free end, a probe operatively interconnected to the free end of the support to be carried thereby, a brake operatively interconnected to the reel for holding the reel stationary when the brake is in one condition thereof, and a control unit operatively interconnected to the motor and to the brake for causing the brake and the motor to raise and lower the probe by winding up the support on the reel and unwinding the support from the reel, the motor comprising an electrically operated stepper motor.

4 Claims, 6 Drawing Sheets

SYSTEM FOR MONITORING A LEVEL OF MATERIAL, DEVICE THEREFOR AND METHODS OF MAKING THE SAME

BACKGROUND OF THE INVENTION

1. Field of the Invention

This invention relates to a new system for monitoring a level of material held in a confining means and to a new device therefor as well as to new methods of making the same.

2. Prior Art Statement

It is known to provide a system for monitoring a level of material held in a confining means, the system comprising a rotatable reel means, electrically operated motor means operatively interconnected to the reel means for causing rotation of the reel means in either direction of rotation thereof, a flexible support means wound on the reel means and having free end means, a probe means operatively interconnected to the free end means of the support means to be carried thereby, brake means operatively interconnected to the reel means for holding the reel means stationary when the brake means is in one condition thereof, and control means operatively interconnected to the motor means and the brake means for causing the brake means and the motor means to raise and lower the probe by winding up the support means on the reel means and unwinding the support means from the reel means. For example, see the Taylor U.S. Pat. No. 3,729,667.

SUMMARY OF THE INVENTION

It is one feature of this invention to provide a new system for monitoring a level of material held in a confining means wherein the number of the parts thereof has been reduced.

For example, it was found according to the teachings of this invention that an electrically operated stepper motor can be utilized in place of the electrically operated motor, the capacitor means and the friction brake of the prior known system as set forth in the aforementioned Taylor U.S. Pat. No. 3,729,667 while still providing for accurate measurements by the system.

In addition, it was found according to the teachings of this invention that the mechanical counter of the prior known system of the Taylor U.S. Pat. No. 3,729,667 can be replaced with an optical shaft encoder and thereby permit a microprocessor to form part of the control means of the system so that the system can provide many new features over the prior known system, such as measuring the volume in addition to the level of the material in the confining means.

Also, it was found according to the teachings of this invention that since digital electrical signals can be utilized with the system, a new sensor or probe means can be utilized with the system of this invention to provide for measuring both the overall and interface levels of the material in a confining means, such a single sensor or probe means not having any moving parts.

Therefore, one embodiment of this invention provides a system for monitoring a level of material held in a confining means, the system comprising a rotatable reel means, electrically operated motor means operatively interconnected to the reel means for causing rotation of the reel means in either direction of rotation thereof, a flexible support means wound on the reel means and having a free end means, a probe means operatively interconnected to the free end means of the support means to be carried thereby, brake means operatively interconnected to the reel means for holding the reel means stationary when the brake means is in one condition thereof, and control means operatively interconnected to the motor means and the brake means for causing the brake means and the motor means to raise and lower the probe means by winding up the support on the reel means and unwinding the support means from the reel means, the motor means comprising an electrically operated stepper motor means.

Accordingly, it is an object of this invention to provide a new system for monitoring a level of material held in a confining means, the system of this invention having one or more of the novel features of this invention as set forth above or hereinafter shown or described.

Another object of this invention is to provide a new method of making such a system, the method of this invention having on or more of the novel features of this invention as set forth above or hereinafter shown or described.

Another object of this invention is to provide a new device for monitoring a level of material held in a confining means, the device of this invention having one or more of the novel features of this invention as set forth above or hereinafter shown or described.

Another object of this invention is to provide a new method of making such a device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a perspective view of the new device of this invention for monitoring a level of material held in a confining means or the like.

DESCRIPTION OF THE PREFERRED EMBODIMENT

Figure 1:
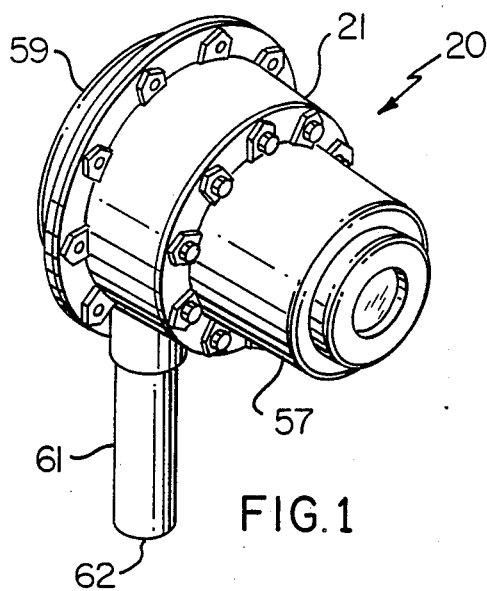

While the various features of this invention are hereinafter illustrated and described as being particularly adapted to provide means for monitoring the level of material held in a confining means or the like, it is to be understood that the various features of this invention can be utilized singly or in various combinations thereof to provide a measuring device for other types of apparatus as desired.

Therefore, this invention is not to be limited to only the embodiment illustrated in the drawings because the drawings are merely utilized to illustrate one of the wide variety of uses of this invention.

Figure 2:
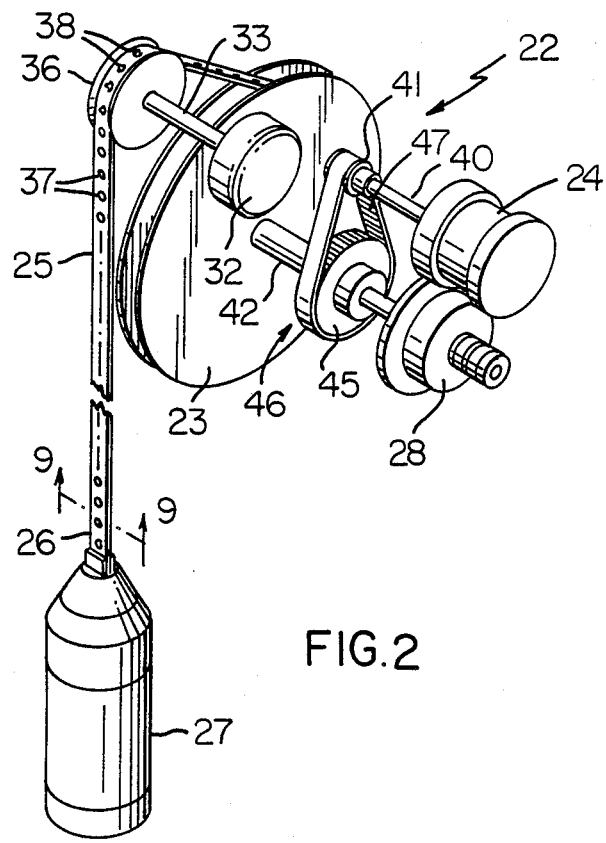
FIG. 2 is a schematic perspective view of various parts of the new device and system of this invention for monitoring a level of material held in a confining means.
Figure 4:
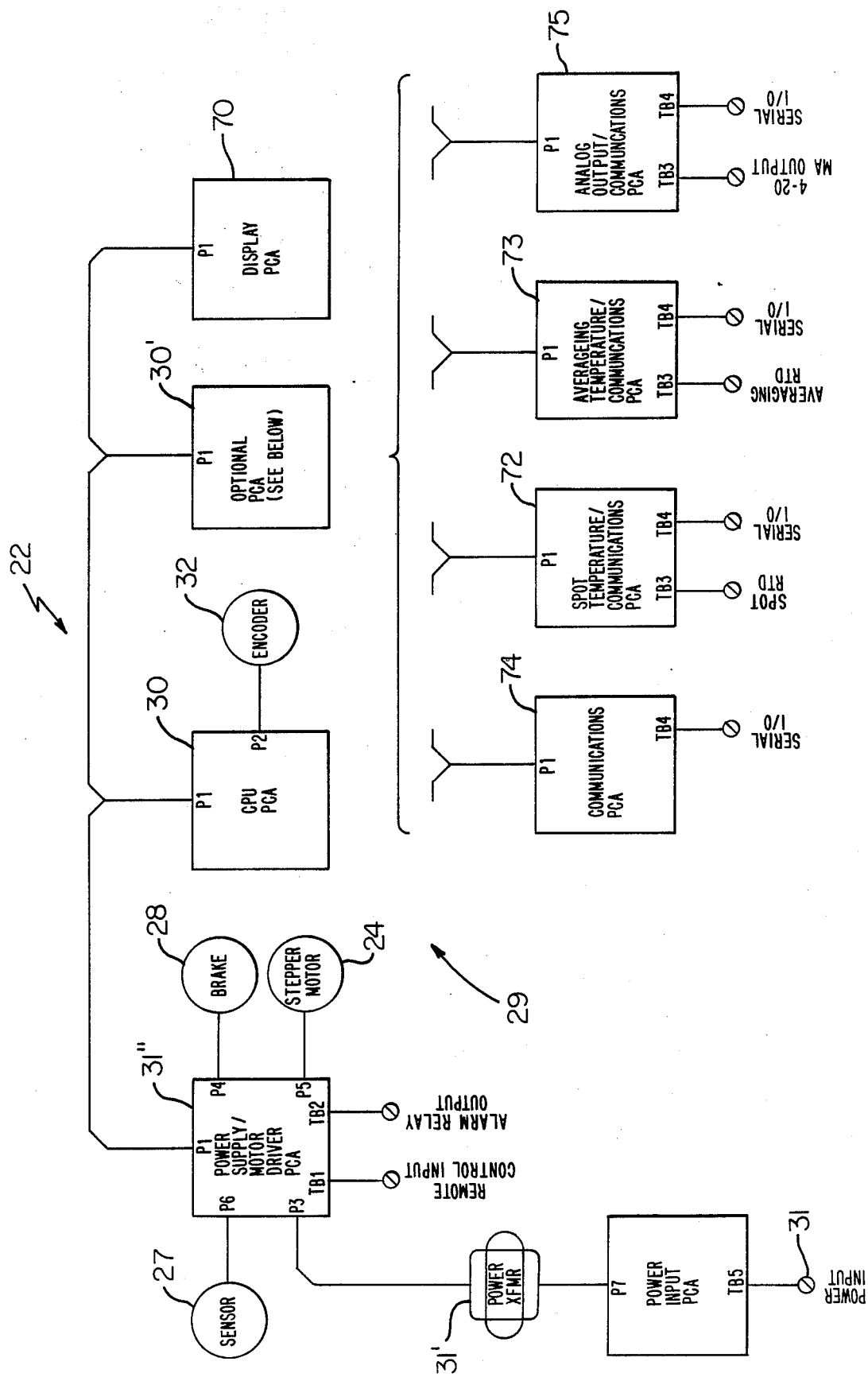
FIG. 4 is a schematic view illustrating the various parts of the new system of this invention.
Figure 5:
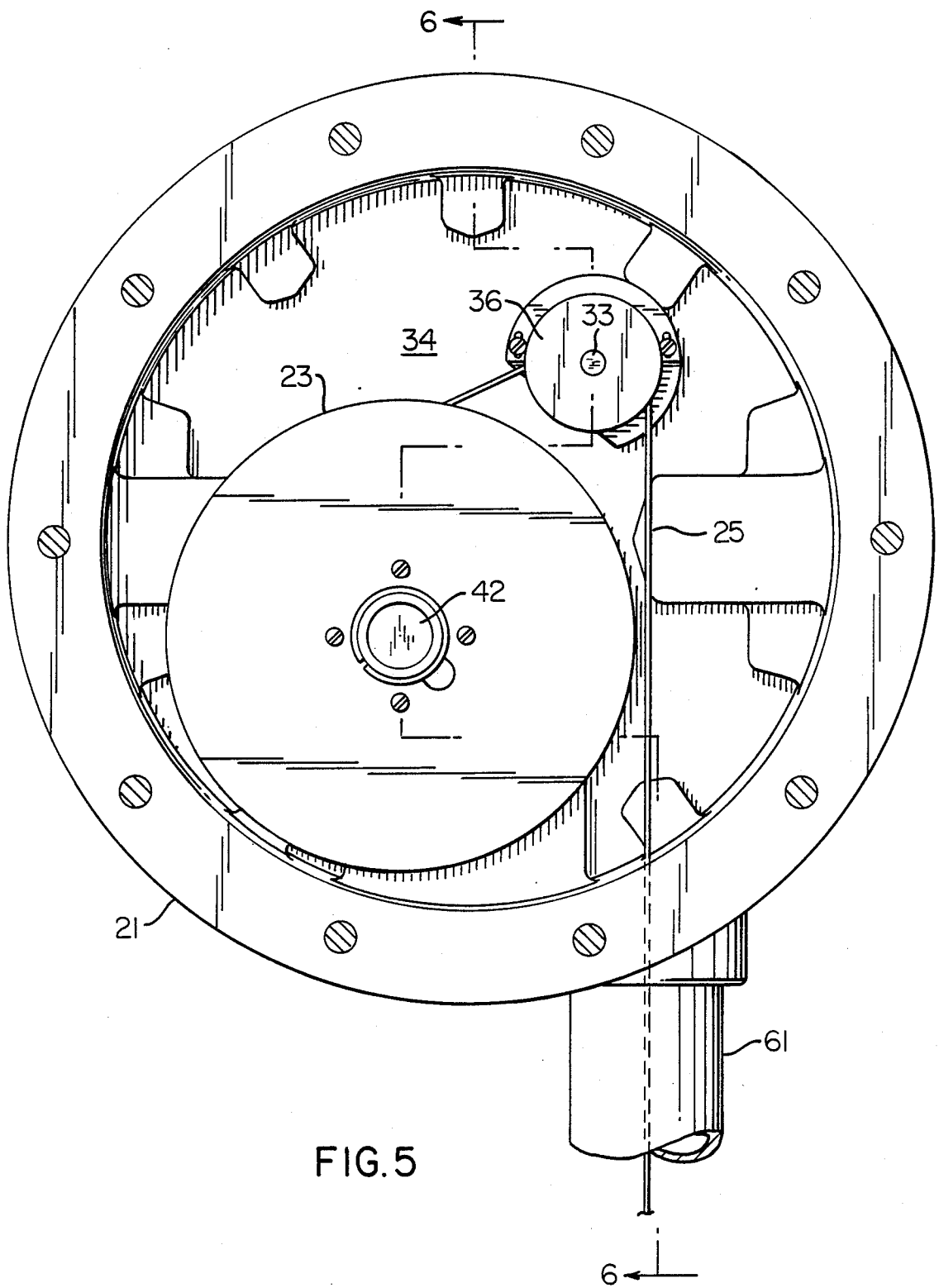
FIG. 5 is a fragmentary cross-sectional view taken on line 5—5 of FIG. 6.

Referring now to FIG. 1, the new device of this invention for monitoring a level of material held in the confining means or the like is generally indicated by the reference numeral 20 and comprises a housing means 21 which carries various parts of the system of this invention that is generally indicated by the reference numeral 22 in FIGS. 2 and 4 and comprising a rotatable reel means 23, an electrically operated motor means 24 for causing rotation of the reel means 23 in either direction of rotation thereof, a flexible support means 25 having a portion thereof wound on the reel means 23 and having a free end means 26, a probe means 27 operatively interconnected to the free end means 26 of the support means 25 to be carried thereby, a brake means 28 operatively interconnected to the reel means 23 for holding the reel means 23 stationary when the brake means 28 is in one condition thereof, and control means that is generally indicated by the reference numeral 29 in FIG. 4 and being operatively interconnected to the motor means 24 and the brake means 28 for causing the brake means 28 and the motor means 24 to raise and lower the probe means 27 by winding up the support means 25 on the reel means 23 and unwinding the support means 25 from the reel means 23.

Figure 6:
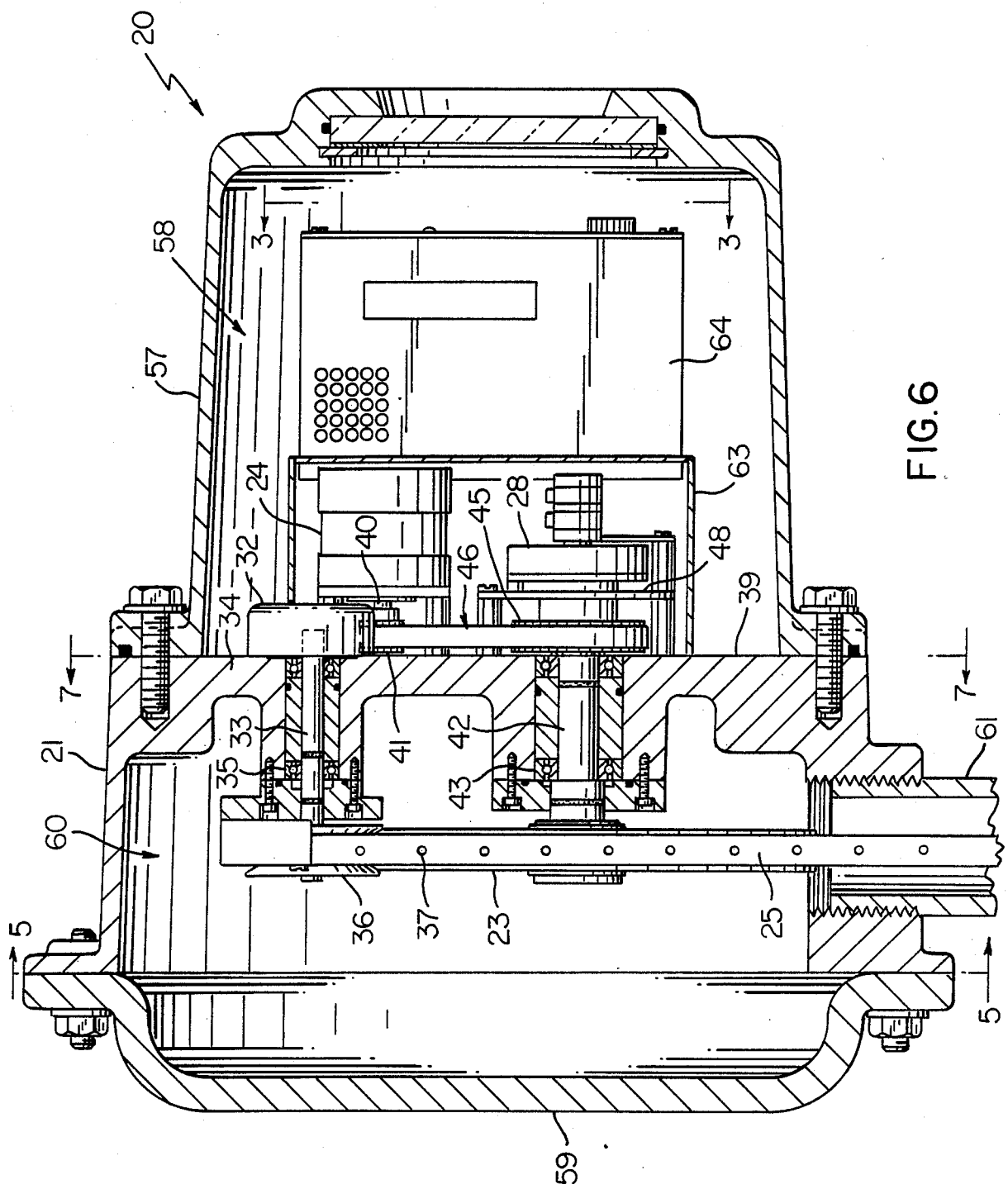
FIG. 6 is a fragmentary cross-sectional view taken on line 6—6 of FIG. 5.
Figure 7:
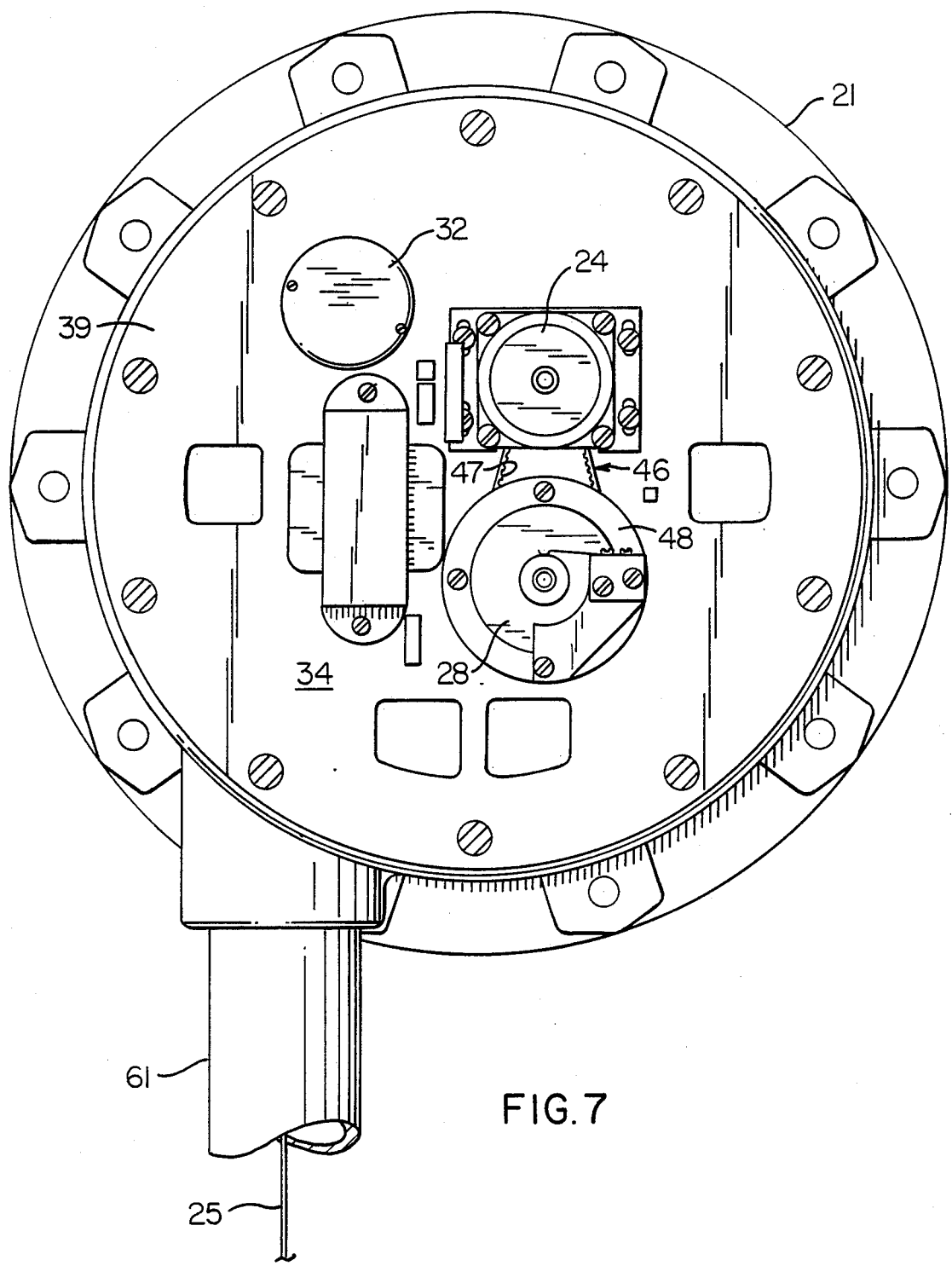
FIG. 7 is a fragmentary cross-sectional view taken on line 7—7 of FIG. 6 with the housing means that contains the electronic parts of the device removed.

The control means 29 comprises microprocessor means 30 that is electrically interconnected to an electrical power source means 31 through a transformer means 31' and a printed circuit assembly 31" and to the motor means 24, brake means 28 and sensor or probe means 27 through the printed circuit assembly 31" in a manner well known in the electronic art as well as to an optical shaft encoder means 32 that senses the rotational movement of a shaft means 33 in a manner well known in the optical shaft encoder art, the shaft means 33 being rotatably carried by an interior wall means 34 of the housing means 21 by suitable bearing means 35 as illustrated in FIG. 6.

A sprocket means 36 is fixed to the shaft means 33 so as to rotate the shaft means 33 in unison therewith, the flexible support means 25 being disposed around part of the sprocket means 36 so as to cause rotation of the sprocket means 36 and, thus, the shaft means 33 as the flexible support means 25 is unwound from the reel means 23 or wound onto the reel means 23 as will be apparent hereinafter.

For example, the flexible support means 25 can comprise a substantially flat flexible plastic tape means that has uniformly spaced perforations 37 therethrough that extend along the longitudinal axis thereof and are of a size and spacing so as to mesh with sprocket pins 38 on the sprocket means 36 so as to provide a driving relation between the tape means 25 and the sprocket means 36 without slippage therebetween as fully set forth in the aforementioned Taylor U.S. Pat. No. 3,729,667, whereby this patent is being incorporated into this disclosure by this reference thereto.

The motor means 24 is mounted to the side 39 of the interior wall means 34 of the housing means 21 and has an output shaft means 40 carrying a pinion gear means or toothed pulley means 41.

The reel means 23 has a shaft means 42 that is rotatably mounted through the wall 34 of the housing means 21 by suitable bearing means 43, the reel means 23 having a hub means 44 secured to the shaft means 42 so as to rotatably mount the reel means 23 in aligned relation with the sprocket means 36 as illustrated in FIG. 6 and carries a pinion gear means or toothed pulley means 45 adjacent the side 39 of the wall means 34.

Therefore, the shaft means 40 of the motor means 24 and the shaft means 42 of the reel means 23 are disposed in spaced apart parallel relation and are operatively interconnected together by a drive means 46 that comprises a flexible endless belt construction having teeth 47 on the interior surface thereof and disposed in meshing relation with the teeth of the aligned pulley means 41 and 45 so as to positively cause rotation of the shaft means 42 of the reel means 23 as the shaft means 40 of the motor means 24 is rotated in a manner hereinafter set forth.

The electrically operated brake means 28 is carried by the interior wall means 34 of the housing means 21 and is disposed on the shaft means 42 of the reel means 23 to control movement of the shaft means 42 in a manner hereinafter set forth.

The brake means 28 is so constructed and arranged that the same will hold the shaft means 42 of the reel means 23 stationary unless the control means 30 interconnects the power source 31 to the brake means 28 and as long as an electrical current is supplied to the brake means 28, the brake means 28 is in a condition thereof to permit the shaft means 42 of the reel means 23 to be rotated by the motor means 24 in a manner hereinafter set forth. Thus, the brake means 28 holds the reel means 23 stationary whenever the electrical current to the brake means 28 is terminated.

Figure 8:
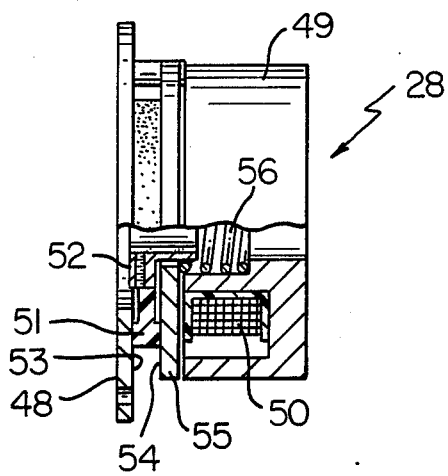
FIG. 8 is a side view, partially in cross section, and illustrates the electrically operated brake means for the device of this invention.

In one working embodiment of the device 20 of this invention, the brake means 28 comprises P/N BFR-27-12-6 sold by the Deltran Division of American Precision Industries of Buffalo, N.Y. and is illustrated in detail in FIG. 8.

As illustrated in FIG. 8, the brake means 28 has a mounting plate 48 that is secured to the side 39 of the interior wall means 34 of the housing means 21 and, in turn, carries a housing means 49 that has a solenoid coil 50 therein. A rotatable plate 51 has a hub 52 for fastening onto the shaft means 42 of the reel means 23 so that the plate 51 rotates therewith between a side 53 of the mounting plate 48 and a side 54 of an axially movable armature plate 55 which is normally urged into frictional engagement with the hub plate 51 by a compression spring 56 so that the hub plate 51 is squeezed between the sides 53 and 54 of the plates 48 and 54 by the spring 56 to prevent rotation of the hub plate 51 and, thus, rotation of the shaft means 42 of the reel means 23. However, when the microprocessor means 30 of the control means 39 interconnects the power source 31 to the solenoid coil 50, the solenoid coil 50 draws the armature plate 55 to the right in FIG. 8 in opposition to the force of the compression spring 53 so that the hub plate 51 is free to rotate and thereby permit rotation of the shaft means 42 of the reel means 23 in a manner well known in the art.

The motor means 24 of the device 20 comprises an electrically operated stepper motor. For example, in one working embodiment of this invention the stepper motor means 24 comprises P/N PJ55-B1 sold by the Nippon Pulse Motor Company, Ltd., of Japan. Such a stepper motor is bipolar and is driven by applying alternating polarities to each coil thereof in turn in a manner well known in the art. If both coils are always energized when the motor 24 is moving, the motor means 24 is said to be "single stepping". If, when a coil of the motor means 24 is set to change state, another phase with that coil turned off is inserted, the motor means 24 is "half stepping". This particular stepper motor means 24 has a resolution of 200 steps per revolution of the shaft means 40 so that half stepping increases that to 400 steps per revolution whereby accurate positioning of the probe means 27 relative to the level of the material to be measured can take place as will be apparent hereinafter.

The housing means 21 of the device 20 of this invention includes an end cover means 57 that is secured to the side 39 of the interior wall means 34 to define an interior chamber 58 therewith. Similarly, the housing means 21 includes another end cover 59 that is secured to the housing means 21 to define a chamber 60 therein on the other side of the interior wall means 34, the chamber 60 containing the sprocket means 35 and reel means 23 and having an outlet conduit 61 through which the tape 25 can lead from the reel means 23 so as to extend out of a free end 62 of the conduit means 61.

The motor means 24, brake means 28 and optical shaft encoder means 32 are disposed in the chamber 58 of the housing means 21 with the motor means 21 and brake means 28 being covered by a covering structure 63 onto which is disposed another covering means 64 and in which all of the electronics of the control means 29 can be suitably disposed so as to control the operation of the device 20 in a manner hereinafter set forth.

The flat tape means 25 has two conductors 65 extending along the longitudinal length thereof in spaced apart parallel relation and being completely embedded therein to be insulated thereby, the conductors 65 being utilized to electrically interconnect the probe means 27 with the microprocessor means 30 in any suitable manner, such as through suitable slip ring means at the shaft means 42 of the reel means 23 as set forth in the aforementioned Taylor U.S. Pat. No. 3,729,667.

While the probe means 27 can be a conductivity type of probe means and/or a float operated probe means such as set forth in the aforementioned Taylor U.S. Pat. No. 3,729,667, the same can comprise a new proximity type of probe means of this invention that operates in a manner hereinafter set forth.

Figure 10:
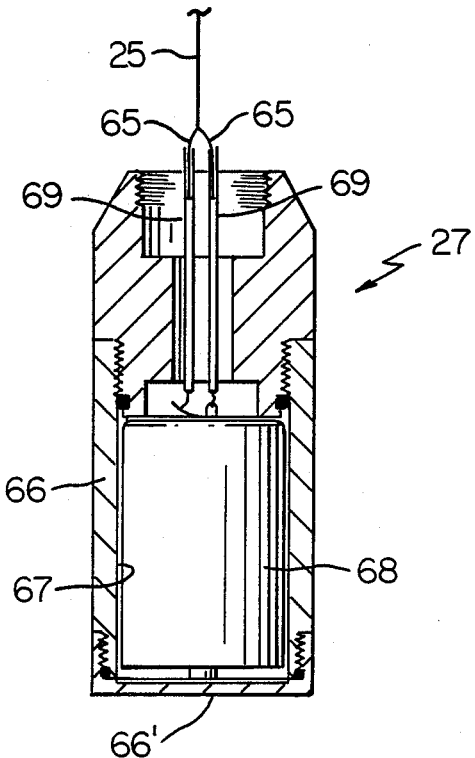
FIG. 10 is an enlarged cross-sectional view illustrating the new sensor or probe means of this invention for the device and system of this invention.
Figure 9:
FIG. 9 is an enlarged cross-sectional view taken on line 9—9 of FIG. 2.

As illustrated in FIG. 10, the proximity type of probe means 27 of this invention comprises a housing means 66 having a chamber 67 therein which contains the electronic proximity means 68 which is formed in a manner well known in the art to be of the capacitance type that produces a variable pulse width output through the conductor means 65 which are electrically interconnected to the proximity means 68 by respective leads 69.

When the material being measured by the device 20 of this invention comprises liquid that has various layers of different liquids, the probe means 27 can be utilized to first send a signal to the microprocessor means 30 when the probe means 27 is first disposed in a certain proximity to the top surface of the top layer of liquid and then send a second signal when the probe means 27 is further lowered and reaches an interface of the top liquid layer with the next adjacent liquid layer by sending a second signal to the microprocessor means 30 which then can calculate the total depth of the top layer from such two signals.

In fact, the microprocessor means 30 can be so programmed that the same can calculate the actual volume of the material being measured by the device 20 as will be apparent hereinafter.

Figure 3:
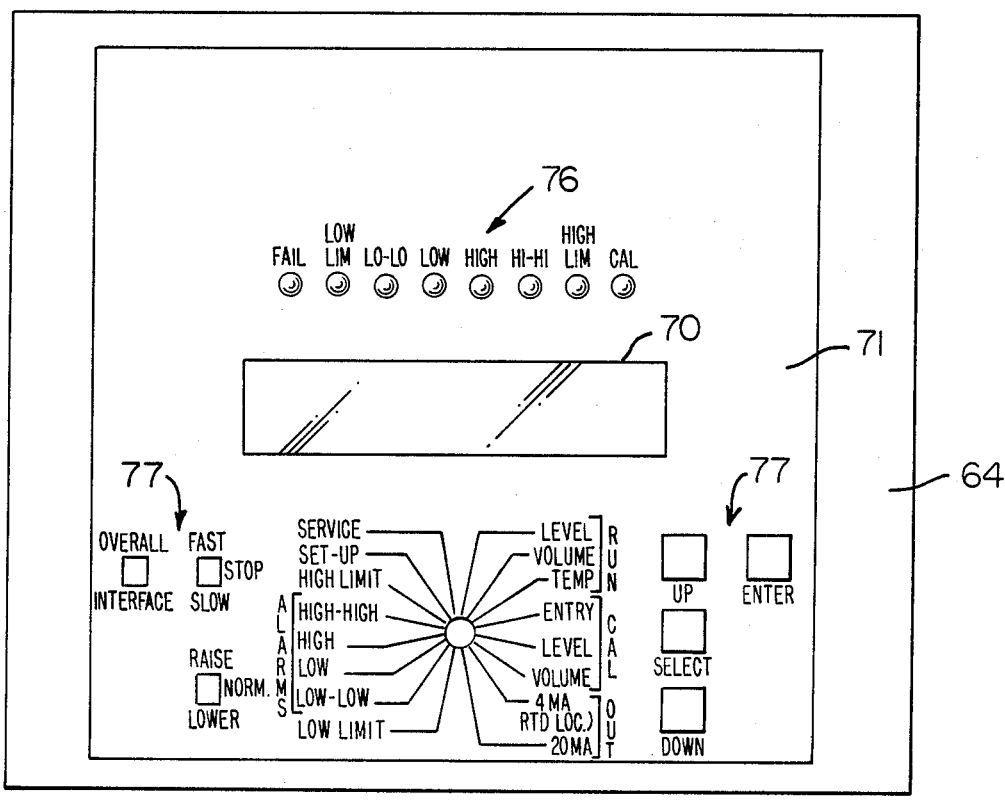
FIG. 3 is an enlarged front view of the control panel means for the device of FIG. 1 and is taken generally in the direction of the arrows 3—3 of FIG. 6, the control panel means in FIG. 3 having the control knob thereof removed.

Since the programming of microprocessor means through software, hardware and the like and the use of associated electronic circuit means for such microprocessor means are both well known in the art, the details of the control means 29 of this invention will not be set forth except to describe in general how the same can be utilized to produce various outputs, such as indicating the level being measured at a liquid crystal display means 70 that is located at the front control panel 71 of the covering means 64 of the housing means 21 as illustrated in FIG. 3. It can be seen from FIG. 3 that the device 20 can be programmed to provide alarms both visual and audible should the probe means 27 be moved out of a high or high high range thereof or below a low or low low range thereof. Also, the device may measure temperature using either a spot or a multi-element averaging RTD when the printed circuit assemblies 72 and 73 of FIG. 4 are utilized with the optional PCA arrangement 30'. These assemblies 72 and 73 measure values and other data that is either manually entered into the microprocessor means 30 through the control panel means 71 at calibration time or passed into it over the communication channels that are represented by the printed circuit assemblies 74 and 75 when the same are coupled with the optional PCA means 30' of FIG. 4.

Thus, it can be seen that the device 20 and system 22 of this invention are adapted to measure level by lowering the sensor or probe means 27 into a vessel or other confining means containing the material until the surface thereof is reached by the probe means 27.

The probe means 27 is suspended at the free end means 26 of the tape means 25 with the probe means 27 either being a float sensor means employing a float containing a magnet which activates a reed switch in the probe means 27 or a conductivity probe means that measures electrical resistance to ground both of which are set forth in the aforementioned Taylor U.S. Pat No. 3,729,667.

However, if the probe means 27 is the proximity sensor means of this invention, the same will measure capacitance between a sensing plate 66' thereof and ground so that when the probe means 27 approaches the surface of the material, the capacitance increases and the surface is detected by the microprocessor means 30 receiving such signal from the probe means 27.

The punched tape means 25 passes over the sprocket means 36 and is wound up on the reel means 26. The position of the probe means 27 is controlled by the stepper motor means 24 which drives the reel means 23 through the drive means 46. The position of the probe means 27 is measured using the incremental optical encoder means 32 that is operatively associated with the shaft means 33 of the sprocket means 36. In the one working embodiment of this invention, the optical encoder means 32 comprises P/N C-0230-DM-0500 sold by Motion Control Devices, Inc. of Lowell, Mass.

Operation of the device 20 is controlled by the microprocessor means 30 and its associated circuitry as illustrated in FIG. 4.

In addition to the above operations of the device 20, it can be seen that the control means 29 provides for the digital display 70 and for alarm lights 76 on the control panel 71 of FIG. 3, as well as suitable switches 77, FIG. 3, for gauge operation and calibration. Two of the alarms function also as high and low limits and thus prevent the sensor or probe means 27 from travelling outside those limits. The device 20 through the microprocessor 30 is adapted to convert level to volume. This allows conversion of the device 20 for linear or nonlinear tanks to any desired units.

The dual serial communication means 74 and 75 allow remote data query, gauge command, and calibration. Such communication channels may also be used to connect to remote display units.

An optional 4-20 MA analog output is available for the system 22 and this output may be calibrated to produce its output over any portion of the measured range and may correspond to level or volume. If a 4-20 MA output is not specified, temperature measurement capability may be supplied. This circuitry measures the resistance of one or more 100 ohm RTD's and converts the result to temperature in Fahrenheit or Centigrade. Multi-element averaging RTD's with up to twelve elements (plus a spot element) can be supported and this allows measurement of the average product temperature to eliminate errors due to temperature gradient over the heighth of the vessel containing the material to be measured. The measured level is used to select the largest RTD completely submerged in the liquid.

Thus, it can be seen that the primary function of the device 20 is to control the movement of the tape 25 and keep track of the amount of tape 25 played out. The tape 25 is normally stored on the reel means 23 which in the one working embodiment thereof is adapted to hold up to approximately 120 feet of tape 25. The reel means 23 is belt driven by the 200 step/revolution stepper motor means 24 which acts as its own brake after each step thereof so that the brake means 28 merely functions as a device that will apply its braking force to the reel means 23 should electrical current cease to exist in the system 22 of this invention. Thus, the tape 25 is played out at either a high speed of 12 feet per minute or a low speed of 6 feet per minute through single stepping or half stepping of the motor means 24 as previously set forth. The tape 25 is played out over the sprocket means 36 which in one embodiment thereof is sized to yield 6 inches of tape movement per revolution thereof. The rotation of this sprocket means 36 is measured using the optical shaft encoder means 32 which in the one working embodiment thereof has an output of 500 cycles per revolution thereof. This allows tape movement to be measured with a resolution of approximately 0.012 inches or 0.001 feet. The tape 25 is raised and lowered at intervals (update time) selected by the user until the probe means 27 detects the specified level of the material. Either overall level or interface level is selected by the user and since various types of sensors can be used to detect the level, only two types of sensor outputs are used. All sensor types other than the proximity sensor previously described have an on/off contact output while the proximity has a pulse frequency modulated (PFM) output as previously described.

Therefore, since the reasons for using a level measuring means and how the same is generally operated are fully set forth in the aforementioned Taylor U.S. Pat. No. 3,729,667, a further discussion of the operation of the device 20 and system 22 of this invention is not needed.

However, it can be seen that by utilizing the stepper motor means 24 of this invention, the brake means 28 is only needed to apply its braking force should electrical current to the stepper motor means 24 be terminated since the stepper motor means 24 provides its own brake means after each step thereof should the microprocessor 30 determine that the stepper motor means 24 is not to further step its shaft means 40. Accordingly, during the use of the system 22, electrical current is supplied to the brake means 28 to maintain the same in an activated condition thereof that fully permits the reel means 23 to be rotated by the stepper motor means 24.

Therefore, it can be seen that this invention not only provides a new system and a new device for monitoring a level of material held in a confining means, but also this invention provides new methods of making such a system and such a device.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a system for monitoring a level of material held in a confining means, said system comprising a rotatable reel means, electrically operated motor means operatively interconnected to said reel means for causing rotation of said reel means in either direction of rotation thereof, a flexible support means wound on said reel means and having a free end means, a probe means operatively interconnected to said free end means of said support means to be carried thereby, brake means operatively interconnected to said reel means for holding said reel means stationary when said brake means is in one condition thereof, and control means operatively interconnected to said motor means and said brake means for causing said brake means and said motor means to raise and lower said probe means by winding up said support means on said reel means and unwinding said support means from said reel means, the improvement wherein said motor means comprises an electrically operated stepper motor means, said control means comprising microprocessor means, said flexible support means having conductor means carried thereby, said control means having means to operatively interconnect said conductor means to said microprocessor means, said probe means having means operatively interconnected to said conductor means to signal to said microprocessor means a relationship of said probe means relative to said level of said material in said confining means, said means of said probe means having first means to signal to said microprocessor means its relationship to a first level of said material and having a second means to signal to said microprocessor means its relationship to a second level of said material.

2. A system as set forth in claim 1 wherein said first level is the level of a top layer of said material and said second level is an interface level between said top layer of said material and an adjacent lower layer of said material.

3. In a device for monitoring a level of material held in a confining means, said device comprising a housing means, a rotatable reel means carried by said housing means, electrically operated motor means carried by said housing means and being operatively interconnected to said reel means for causing rotation of said reel means in either direction of rotation thereof, a flexible support means wound on said reel means and having a free end means, a probe means operatively interconnected to said free end means of said support means to be carried thereby, brake means carried by said housing means and being operatively interconnected to said reel means for holding said reel means stationary when said brake means is in one condition thereof, and control means carried by said housing means and being operatively interconnected to said motor means and said brake means for causing said brake means and said motor means to raise and lower said probe means by winding up said support means on said reel means and unwinding said support means from said reel means, the improvement wherein said motor means comprises an electrically operated stepper motor means, said control means comprising microprocessor means, said flexible support means having conductor means carried thereby, said control means having means to operatively interconnect said conductor means to said microprocessor means, said probe means having means operatively interconnected to said conductor means to signal to said microprocessor means a relationship of said probe means relative to said level of said material in said confining means, said means of said probe means having first means to signal to said microprocessor means its relationship to a first level of said material and having a second means to signal to said microprocessor means its relationship to a second level of said material.

4. A device as set forth in claim 3 wherein said first level is the level of a top layer of said material and said second level is an interface level between said top layer of said material and an adjacent lower layer of said material.

* * * * *